(12) United States Patent
Hennig

(10) Patent No.: US 6,435,238 B1
(45) Date of Patent: Aug. 20, 2002

(54) COMBINATION OF AN AUTOMATIC TIRE INFLATION SYSTEM AND ANTI-LOCKING BRAKING SYSTEM

(75) Inventor: Mark Kevin Hennig, Corpus Christi, TX (US)

(73) Assignee: Equalaire Systems, Inc., Corpus Christi, TX (US)

( * ) Notice: Subject to any disclaimer, the term of this patent is extended or adjusted under 35 U.S.C. 154(b) by 0 days.

(21) Appl. No.: 09/815,121

(22) Filed: Mar. 22, 2001

(51) Int. Cl.[7] .......................... B60C 23/10; B60C 29/00; B60T 13/00; B60T 8/34; B60T 8/72
(52) U.S. Cl. ...................... 152/417; 152/415; 303/9.66; 303/127; 303/191; 188/181 R; 340/442
(58) Field of Search .................. 152/415, 416, 152/417, 427, 428; 303/9.66, 122.05, 123, 127, 132, 166, 189, 191; 188/181 R; 340/442, 444

(56) References Cited

U.S. PATENT DOCUMENTS

| | | | | |
|---|---|---|---|---|
| 3,887,046 A | * | 6/1975 | Bueler ..................... | 188/181 A |
| 3,916,234 A | * | 10/1975 | Stigall et al. ................ | 310/155 |
| 3,998,298 A | * | 12/1976 | Fleagle .................... | 188/181 R |
| 4,229,051 A | * | 10/1980 | Mekosh et al. ......... | 188/181 A |
| 4,863,221 A | * | 9/1989 | McNinch, Jr. .......... | 188/181 C |
| 5,287,906 A | | 2/1994 | Stech | |
| 5,327,346 A | * | 7/1994 | Goodell ...................... | 152/416 |
| 5,377,736 A | * | 1/1995 | Stech ......................... | 152/415 |
| 5,584,949 A | * | 12/1996 | Ingram ....................... | 152/417 |
| 5,769,979 A | | 6/1998 | Naedler | |
| 5,839,801 A | * | 11/1998 | Ferguson ................... | 303/191 |
| 6,105,645 A | | 8/2000 | Ingram | |
| 6,131,631 A | | 10/2000 | Bradley et al. | |
| 6,145,559 A | | 11/2000 | Ingram, II | |
| 6,244,316 B1 | * | 6/2001 | Naedler ...................... | 152/417 |
| 6,269,691 B1 | * | 8/2001 | Sowatzke et al. .......... | 152/416 |
| 6,325,124 B1 | * | 12/2001 | Colussi et al. ............. | 152/415 |

* cited by examiner

*Primary Examiner*—S. Joseph Morano
*Assistant Examiner*—Jason R. Bellinger
(74) *Attorney, Agent, or Firm*—Fulbright & Jaworski

(57) ABSTRACT

The present invention is directed to the interface of various components of an automatic tire inflation system and an anti-locking braking system through the inside of a stationary axle of a vehicle.

9 Claims, 3 Drawing Sheets

COMBINATION OF AN AUTOMATIC TIRE INFLATION SYSTEM AND ANTI-LOCKING BRAKING SYSTEM

FIELD OF THE INVENTION

This invention is directed to a vehicle having an anti-locking braking system and an air supply and relates to the combination of an automatic tire inflation system for providing air to a rotating tire on a wheel of the vehicle and a wheel speed sensor of the anti-locking braking system for monitoring the speed of rotation of the wheel. More specifically, the invention is directed to the interface of components of the automatic tire inflation system and the anti-locking braking system through a stationary hollow axle connected to the vehicle and the wheel.

BACKGROUND OF THE INVENTION

It is known, as disclosed in U.S. Pat. Nos. 5,287,906; 5,769,979; 6,105,645; 6,131,631; and 6,145,559 to provide an automatic tire inflation system (ATIS) in which the air in rotating tires in a vehicle is controlled through a rotary air connection between an air supply on the vehicle and each of the tires. Such systems insure that the tires are properly inflated for ease of control of the vehicle and consequently its safety, and to provide even wear and long life of the expensive tires.

It is also well known to provide a vehicle with an anti-locking braking system (ABS) which includes a wheel speed sensor for monitoring the speed of rotation of the wheels for controlling the braking of the vehicle.

Also, in the past it has been known to position certain components of the ABS or ATIS inside the axle of a vehicle. The present invention is directed to positioning certain components of both the ATIS and the ABS in a hollow axle of a vehicle and interface the various components of the ATIS and ABS so that each may perform its intended function without interfering with the other system.

SUMMARY

The present invention is directed to the combination and interfacing of an automatic tire inflation system for providing air to a rotating tire on a wheel of a vehicle and a wheel speed sensor of an anti-locking braking system for monitoring the speed of rotation in the wheel in a vehicle having an anti-locking braking system and an air supply.

A further object of the present invention is in the combination and including a stationary hollow axle connected to the vehicle and said wheel. The axle is connected to the air supply for supplying air to the inside of the axle and a rotary connection is in communication between the tire and the air inside the axle. The wheel speed sensor includes a rotor assembly connected to the wheel and a coacting stator assembly connected to the end of the axle and having a cable extending from the stator assembly through the inside of the axle to the anti-locking braking system. A support is positioned in and engages the inside of the axle and includes an axial opening therethrough. The rotary connection includes a first stationary part connected to and supported in the axial opening and the first part extends coaxially through the stator assembly. The support includes a second opening through which the cable extends.

Still a further object of the present invention is wherein in one form of the invention an air conduit is positioned inside the axle and is sealably connected to the first stationary part.

Yet a still further object of the present invention is wherein in another embodiment of the invention the support sealingly engages the inside of the axle and the cable sealingly extends through the second opening.

Another object of the present invention is wherein the first stationary part includes a retainer sealably engaging the air conduit.

Another object of the present invention is wherein the first stationary part engages the stator assembly for holding the stator assembly in position in the end of the axle.

Another object of the present invention is wherein the first stationary part includes first and second connectible components extending into the stator assembly, one of which is connected in the axial opening and the other of which engages the stator assembly. In addition, the stationary part includes an air passageway extending therethrough.

Still a further object is wherein the first and second components are threadably connected and include a seal therebetween.

And yet a further object is wherein the first and second components each includes a non-circular wrench engaging surface for installing the components in the axle and to the support and to the stator assembly.

Other and further objects, features and advantages will be apparent from the following description of presently preferred embodiments of the invention, given for the purpose of disclosure, and taken in conjunction with the accompanying drawings.

DESCRIPTION OF THE PREFERRED EMBODIMENT

Figure 1:
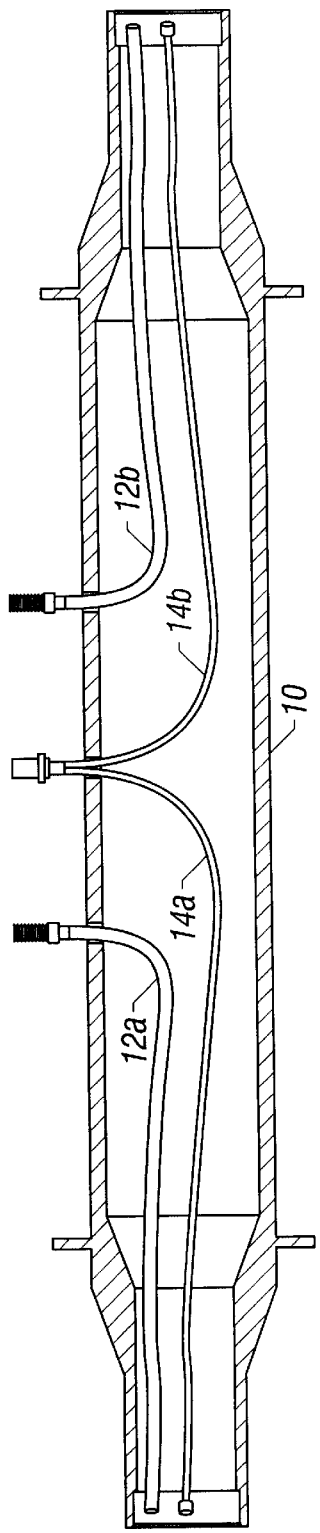
FIG. 1 is an elevational cross-sectional view of a hollow axle on a vehicle showing connections of an air supply to the inside of the axle and also showing a connection of a control cable of an anti-locking braking system leading to wheel speed sensors.

Referring now to FIG. 1, the reference numeral 10 generally indicates a stationary hollow axle connected to a vehicle (not shown) which includes an anti-locking braking system and an air supply and which includes a rotating tire (not shown) on a wheel at each end of the axle 10. The axle 10 is connected to an air supply on the vehicle for supplying air to the inside of the axle 10, here shown as a pair of conduits 12*a* and 12*b*, preferably flexible, positioned inside of the axle 10 and directed to opposite ends, respectively, of the axle 10. In addition, cables 14*a* and 14*b* of the ABS are directed to opposite ends, respectively, of the axle 10 for connection to a wheel speed sensor of the ABS as will be more fully described hereinafter.

While various types of rotary connections may be used in communication between the tire and the air supply for providing air to a rotating tire on a wheel the preferred embodiment of the present invention is best seen in FIGS. 1–5 which is similar to that described in U.S. Pat. No. 5,769,979, which for a fuller disclosure is incorporated herein by reference. The axle 10 indicates one axle of a trailer having a plurality of axles with wheels having one or more tires at each end and a hub cap 15 at each end of the axle 10 for retaining lubricant in the wheel bearings, all as described in U.S. Pat. No. 5,584,949, which for a fuller disclosure is incorporated herein by reference.

A rotary connection generally indicated by the reference numeral 20 is supported in position generally in the center of each end of the axle 10, such as by a support 22, which engages the interior of the axle 10. The support plug 22 is preferably a press plug as generally described in U.S. Pat. No. 6,131,631, which may be secured in the inside of the axle 10 by any other suitable means, such as threads or a C-clamp as shown in U.S. Pat. No. 5,769,979. The support 22 includes an axial opening 24, preferably threaded therethrough.

The rotary connection has a first stationary part 28 including first and second components 27 and 29. The first stationary part 28 is connected, preferably threaded, to and supported in the axial opening 24. The first part 28 includes a passageway 30 therethrough, which in a preferred embodiment is in communication with one of the air conduits, such as 12a. A stationary rotary seal 32 encircles the passageway 30. The rotary seal is preferably a lip-type seal and any suitable material, such as NITRILE, is satisfactory.

The rotary connection includes a second part including an elongate tubular member 34, preferably metal, having a first end 36 and a second end 38. The second end 38 is coaxially extendable in the passageway 30 and through the rotary seal 32 and is longitudinally and rotationally movable and thus is in communication with the air in tubing 12a in the inside of the axle 10. The first end 36 of the tubular member 34 is seatingly connected to the hub cap 15 through a floating seal 40. The seal 40 may be any suitable dynamic seal allowing axial and rotational movement of the end 36, such as a lip seal or O-ring seal.

An air connection 42 is provided on the hub cap 15 for connection to the tire or tires at the end of the axle 10. Thus, air may be supplied from the air supply on the vehicle through the air conduit 12a to the rotary connection 20 while the hub cap 15 and wheels (not shown) rotate with the air connection 42. Thus, this structure provides an automatic tire inflation system for providing air to a rotating tire on a wheel of the vehicle.

The use of anti-locking brake systems having a wheel speed sensor for monitoring the speed of rotation of the wheel for controlling anti-locking, such as sold by Wabash National, are well known.

Figure 2:
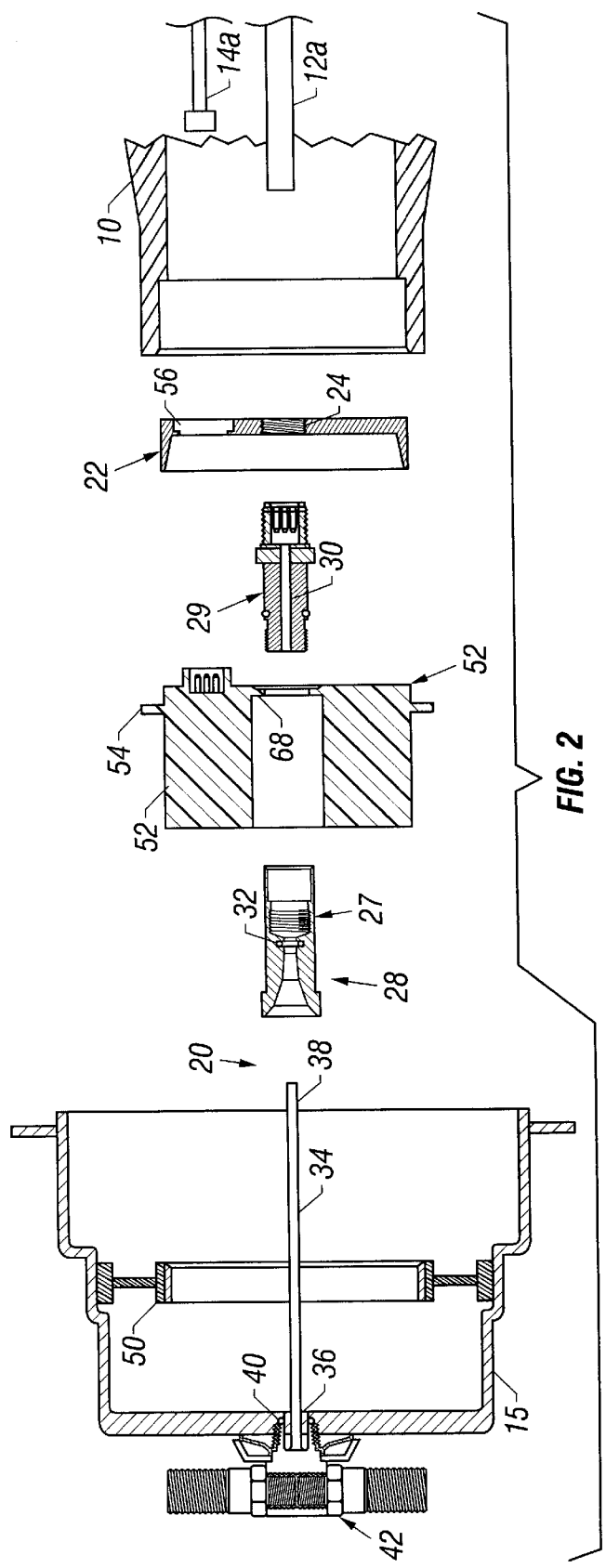
FIG. 2 is an exploded elevational view, in cross section, illustrating the interface between components of the automatic tire inflation system and the anti-locking braking system.
Figure 3:
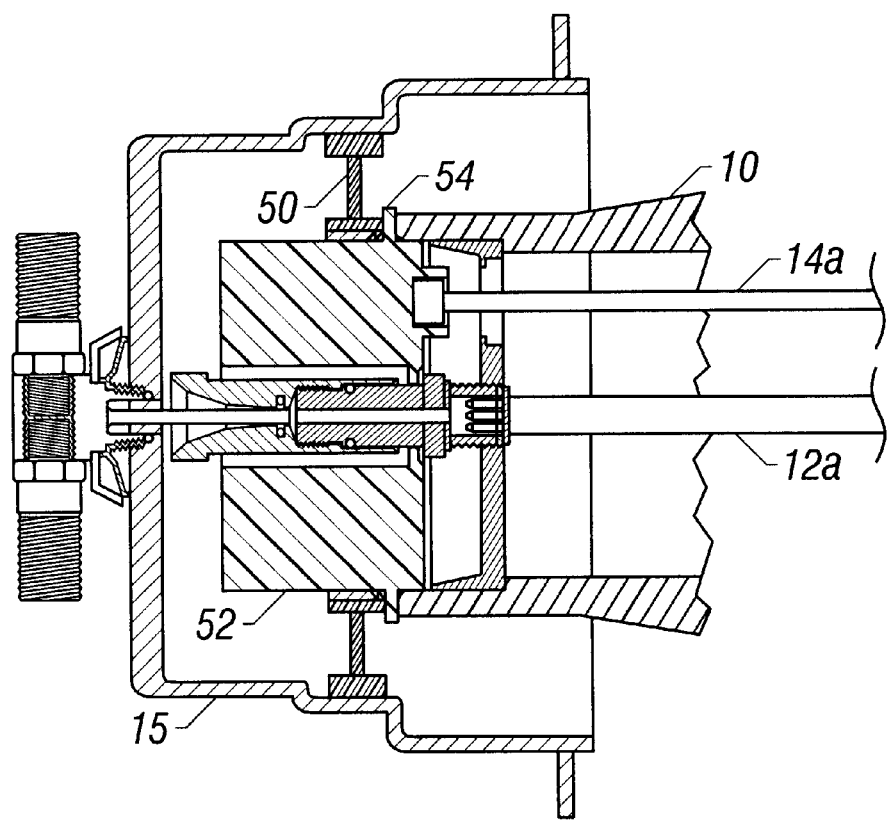
FIG. 3 is an elevational view in cross section of the assembled components of FIG. 2.
Figure 4:
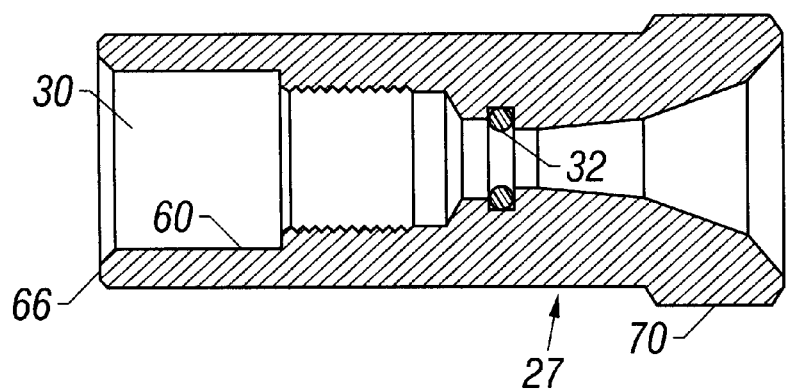
FIG. 4 is an enlarged elevational view in cross section of one component of the stationary part of the rotary connection.
Figure 5:
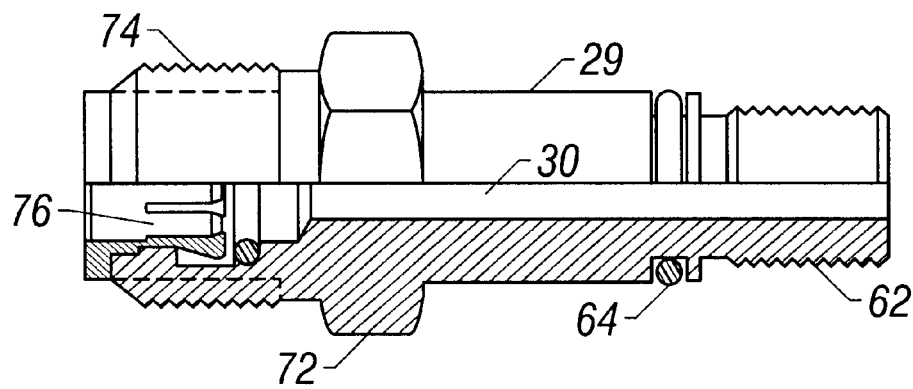
FIG. 5 is an enlarged elevational view, partly in cross section, of the second component of the stationary part of the rotary connection which coacts with the component of FIG. 4.

Referring to FIGS. 2 and 3, the hub cap 15 generally includes a rotor assembly of the wheel speed sensor generally indicated by the reference numeral 50 and a coacting stator assembly 52 connected to the end of the axle 10 and a cable 14a extending from the stator assembly 52 through the inside of the axle. Rotation of the wheel and hub cap 15 and rotor assembly 50 relative to the stator assembly 52 sends an electrical signal through the cable 14a to an anti-locking braking system for controlling the brakes. While any type of anti-locking braking system and speed sensor is satisfactory, one sold by Wabash National may be used in which the hub cap 15 and rotor assembly 50 is sold under part 10600532 and the stator assembly 50 is sold under part no. 10800282 for a curbside assembly and no. 10800283 for a roadside assembly. It is noted that the rotor assembly 50 is affixed in position in the hub cap 15 and the stator assembly 52 includes a lip 54 for positioning the rotator assembly 52 in the end of the axle 10, as best seen in FIG. 3, whereby rotor 50 and stator 52 coact.

As noted in FIGS. 2 and 3, the cable 14a extends through a second opening 56 in the support 22 and is preferably held in position by a grommet and is connected to the stator assembly 52.

Referring now to FIGS. 1–5, it is noted that the stationary part 28 of the rotary connection 20 includes first 27 and second 29 connectable components which extend into the stator assembly 52 of the wheel speed sensor and is connected in the axial opening 24 of the support 22. The first 27 and second 29 components are threadably connected by coacting threads 60 and 62 and include a seal 64 therebetween for sealing the air passageway 30 through the components 27 and 29. It is to be noted that the first component 27 includes a shoulder 66 which, when assembled as shown in FIG. 3, engages a shoulder 68 on the inside of the stator assembly 52 for holding the stator assembly 52 in position in the end of the axle 10. Each of the first 27 and second 29 components include a non-circular wrench engaging surface, such as a hexagonal shoulders 70 and 72, respectively, for installing the stationary part 28.

Preferably, component 29 includes a tapered thread 74 for coacting with the axial opening 24 in the support 22 for supporting the stationary part 28 from the support 22 with more precisely positioning the part 28 in the axle 10. The part 29 also includes a conventional press to lock fitting 76 for engaging and retaining the end of the air conduit 12a with a sealing relationship. The stationary part 28 consisting of the components 27 and 29 provide several important functions: (1) they retain the tubing 12a to the rotary connection 20, (2) they support the stationary part 28 and retain it in position by being threadably connected to the support 22, (3) they provide the stationary support for the rotary connection, and (4) they secure the stator assembly 52 in place.

In order to accurately assemble the present invention the support 22 is accurately positioned in the inside of the axle 10 with the cable 14a extending through the opening 56. Then the component 29 is connected to the air conduit 12a and threadably connected in the axial opening 24 of the support 22 whereby the tapered threaded connection provides an accurate longitudinal position for the component 29. The electrical cable 14a is connected to the stator assembly 52. The stator assembly 52 is then positioned over the projecting end of the component 29 and the first component 27 is threadably connected to the second component 29 to insure that the coacting shoulders 66 and 68 between the component 27 and the stator assembly 52 engage. Thereafter the hub cap 15 along with the tubular member 34 is connected with the tubular member 34 being positioned through the seal 32 and into the passageway 30 and the rotor assembly 50 is positioned to coact with the stator assembly 52.

It is to be noted that the preferred embodiment of FIGS. 1–5 utilize air conduits 12a and 12b and do not require the inside of the axle 10 to be pressurized to supply air to the tires. Thus the support 22 does not require a pressure resistant termination and the passage of the ABS cable 14a through the support 22 is not required to be pressure tight.

Figure 6:
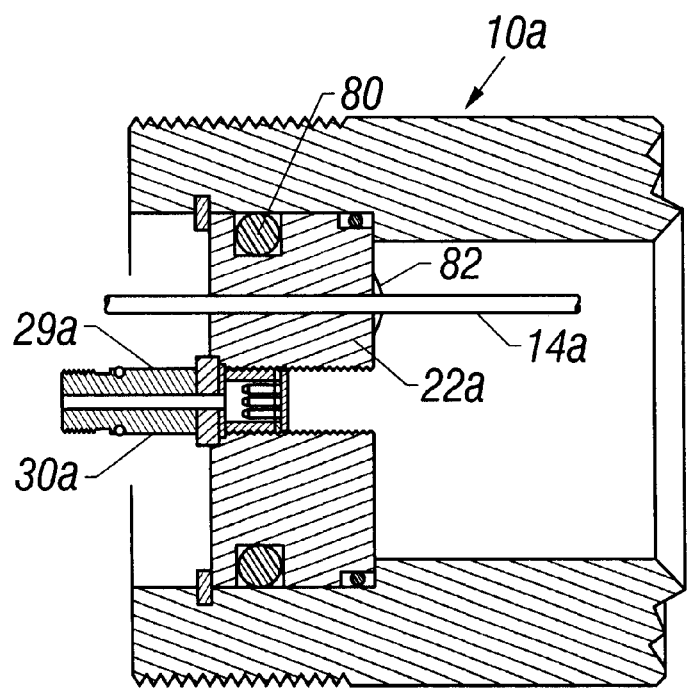
FIG. 6 is an elevational view, in cross section, of another embodiment of the present invention.

However, if it is desired to utilize another embodiment in which the inside of the axle 10 is pressurized and the support 22 is a pressure resistant termination, the embodiment of FIG. 6 may be utilized. In the embodiment in FIG. 6 like parts to those shown in FIGS. 1–5 are similarly numbered with the addition of the suffix "a". In this embodiment the air conduit 12a is omitted, a seal 80 is provided between the support 22a and the inside of the axle 10a. In addition, the passage of the cable 14a through the support 22a has a air sealed connection 82 such as being epoxy.

the present invention, therefore, is well adapted to carry out the objects and attain the ends and advantages mentioned as well as others inherent therein. While presently preferred embodiments of the invention have been given for the purpose of disclosure, numerous changes in the details of construction, and arrangement of parts will be readily apparent to those skilled in the art and which are encompassed within the spirit of the invention and the scope of the appended claims.

What is claimed is:

1. In a vehicle having an anti-locking braking system and an air supply, the combination of an automatic tire inflation system for providing air to a rotating tire on a wheel of the vehicle and a wheel speed sensor of the anti-locking braking system for monitoring the speed of rotation of the wheel comprising, a stationary hollow axle connected to the vehicle and said wheel, said axle connected to the air supply for supplying air to the inside of the axle, a rotary connection in communication between the tire and air inside of the axle, said wheel speed sensor including a rotor assembly connected to the wheel and a coacting stator assembly connected to the end of the axle and having a cable extending from the stator assembly through the inside of the axle to the anti-locking braking system, a support positioned in and engaging the inside of the axle, said support having an axial opening therethrough, said rotating connection having a first stationary part connected to and supported in said axial opening, said first part extending coaxially through said stator assembly, and said support including a second opening through which the cable extends.

2. The apparatus of claim 1 including an air conduit inside the axle and sealably connected to the first stationary part.

3. The apparatus of claim 1 wherein the support sealingly engages the inside of the axle and the cable sealingly extends through the second opening.

4. The apparatus of claim 2 wherein the first stationary part includes a retainer sealably engaging the air conduit.

5. The apparatus of claim 1 wherein the first stationary part engages the stator assembly for holding the stator assembly in position in the end of the axle.

6. The apparatus of claim 1 wherein the first stationary part includes first and second connectable components extending into the stator assembly, one of which is connected in the axial opening and the other of which engages the stator assembly.

7. The apparatus of claim 5 wherein said first part includes an air passageway extending therethrough.

8. The apparatus of claim 6 wherein first and second components are threadably connected and include a seal therebetween.

9. The apparatus of claim 8 wherein the first and second components each include a non-circular wrench engaging surface.

* * * * *